(12) United States Patent
Rumer

(10) Patent No.: US 6,623,186 B2
(45) Date of Patent: Sep. 23, 2003

(54) OPTICAL ETHERNET OVERLAY FOR LOOP TOPOLOGY NETWORK

(75) Inventor: Mark Rumer, Santa Barbara, CA (US)

(73) Assignee: Occam Networks, Santa Barbara, CA (US)

(*) Notice: Subject to any disclaimer, the term of this patent is extended or adjusted under 35 U.S.C. 154(b) by 0 days.

(21) Appl. No.: 09/844,953

(22) Filed: Apr. 26, 2001

(65) Prior Publication Data
US 2002/0159115 A1 Oct. 31, 2002

(51) Int. Cl.[7] .................................................. H04J 14/00
(52) U.S. Cl. ............................. 398/47; 398/48; 398/59; 398/43
(58) Field of Search ................................ 359/123, 119, 359/127, 124

(56) References Cited

U.S. PATENT DOCUMENTS

| | | | |
|---|---|---|---|
| 5,519,695 A | * 5/1996 | Purohit et al. | 370/352 |
| 6,084,694 A | * 7/2000 | Milton et al. | 359/124 |
| 6,141,125 A | * 10/2000 | Blair et al. | 359/110 |
| 6,282,336 B1 | 8/2001 | Riza | |
| 6,288,811 B1 | * 9/2001 | Jiang et al. | 359/124 |
| 6,331,906 B1 | * 12/2001 | Sharma et al. | 359/119 |
| 6,366,712 B1 | 4/2002 | Buabbud et al. | |
| 6,385,366 B1 | 5/2002 | Lin | |
| 6,396,969 B1 | * 5/2002 | Sparks et al. | 385/16 |

OTHER PUBLICATIONS

International Search Report PCT/US02/12158 dated Aug. 20, 2002.

* cited by examiner

Primary Examiner—Leslie Pascal
Assistant Examiner—David C. Payne
(74) Attorney, Agent, or Firm—Blakely Sokoloff Taylor & Zafman LLP

(57) ABSTRACT

A telecommunications network having a ring topology overlaid with an Ethernet. An add/drop multiplexer (ADM) employing wave division multiplexing (WDM) hardware is implemented at each node of a multi-node fiber-based network. The ADM contains a robust protection scheme for reliability. The WDM allows the data traffic of the incumbent network, for example, a SONET network, to be carried over one or more frequencies while the data traffic of one or more packet-based networks may be carried over one or more other frequencies. Each ADM has protection switches, for example, micro-electromechanical switches. The protection switches provide a no-load bypass capability. A failed node can be shunted from the ring, allowing the Ethernet data to bypass the node uninterrupted. The switches also provide a self-test capability. The ADM interfaces can be checked by coupling the receiving path and the transmission path. This allows the ADM transceivers to communicate with each other.

11 Claims, 3 Drawing Sheets

OPTICAL ETHERNET OVERLAY FOR LOOP TOPOLOGY NETWORK

FIELD OF THE INVENTION

The present invention relates generally to fiber-optic (fiber) based telecommunications networks having loop topology, and more specifically to the implementation of an Ethernet on such a network.

BACKGROUND OF THE INVENTION

A standard implementation of a telecommunications network has a central office (CO) and three, or more, remote terminals (RTs) connected to the CO in a redundant ring structure. The CO contains the switching equipment and the loop is the intermediate network between the CO and the end-user. Typical networks are implemented in a redundant, counter-rotating configuration. Such networks may typically employ the synchronous optical network (SONET) standard. SONET defines a hierarchy of interface rates for different fiber-optic transmission systems to allow data streams at different rates to be multiplexed. Employing the SONET standard makes it possible for communication carriers to interconnect existing digital carrier and fiber systems. The RTs of the network have optical add/drop multiplexers (MUXs) through which data transmission access is provided. Each RT throughout the system may add or drop capacity from the network.

A typical ring is designed to carry 1,336 active telephone calls at 64 kbps using a data transmission speed of, for example, optical carrier-3 (OC-3), approximately 155 megabits per second. This equates to supporting approximately 5,000 residential telephone subscribers using a 4:1 concentration ratio. A typical RT may support 1,000–2,000 subscribers. This doesn't allow bandwidth for other data transmission services (e.g., ADSL) that require 100 times as much speed.

Another drawback of a SONET network is that it is time division modulation (TDM) based. Therefore, once a particular amount of available bandwidth is allocated to a particular function, that bandwidth is not available for other purposes. This makes a SONET network poorly suited for data traffic. For example, a particular subscriber may have a T1 line that will be allocated 1.5 megabits per second on the network whether it's being used or not.

SUMMARY OF THE INVENTION

A method is disclosed for overlaying a packet-based telecommunications network on a time division multiplex-based telecommunications network having a ring topology. Add-drop multiplexers are implemented at each node of the time division multiplex (TDM) based telecommunications system, the add-drop multiplexer comprising at least one wave division multiplexers. The TDM-based data is transmitted over a first light frequency and packet-based data is transmitted over a second light frequency.

Other features and advantages of the present invention will be apparent from the accompanying drawings, and from the detailed description, which follows below.

BRIEF DESCRIPTION OF THE DRAWINGS

The present invention is illustrated by way of example and not intended to be limited by the figures of the accompanying drawings in which like references indicate similar elements and in which.

DETAILED DESCRIPTION

A telecommunications network having a ring topology overlaid with an Ethernet is described. An add/drop multiplexer (ADM) employing wave division multiplexing (WDM) hardware is implemented at each node of a multi-node fiber-based network. The ADM contains a robust protection scheme for reliability. The WDM allows the data traffic of the incumbent network, for example, a SONET network, to be carried over one or more frequencies while the data traffic of one or more packet-based networks may be carried over one or more other frequencies.

An intended advantage of the present invention is to provide the ability to overlay an existing TDM-based network with a higher bandwidth, resilient packet-based networking scheme, i.e., provide the ability to overlay an existing operational fiber network with, for example, a Gigabit Ethernet network. Another intended advantage is to implement a fault tolerance for a nodal failure on the network. Another intended advantage is to provide alternative data transmission paths in the event of a fiber failure.

Figure 1:
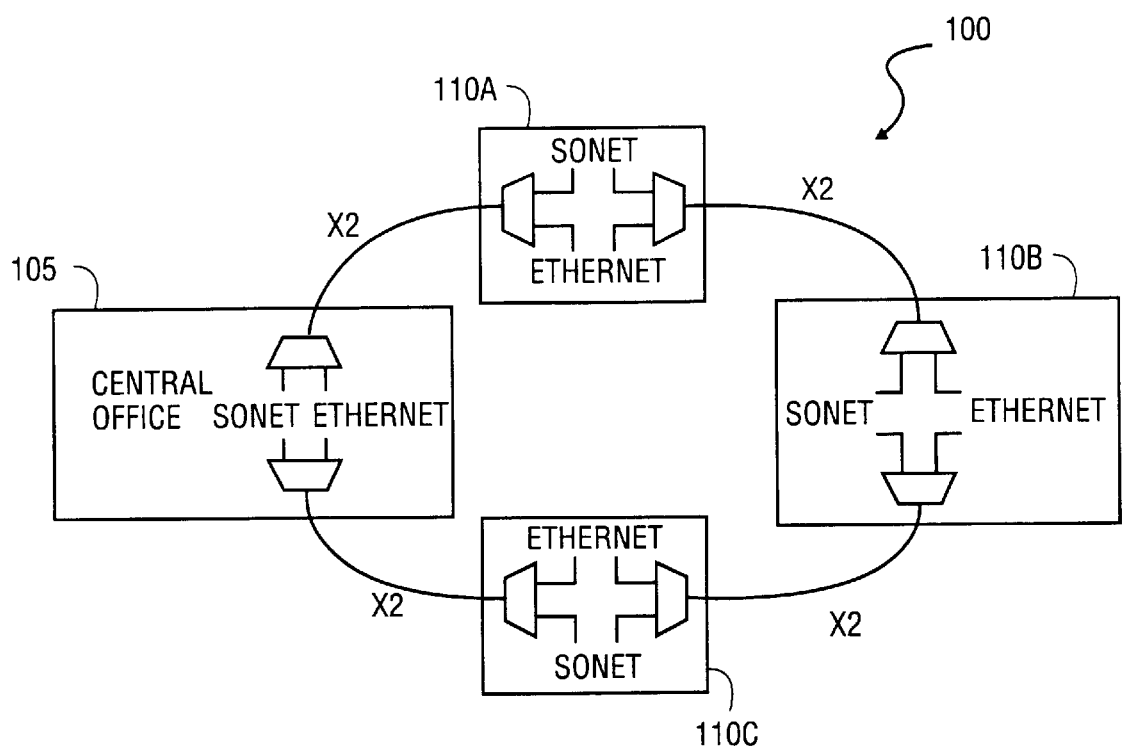
FIG. 1 illustrates a typical SONET-based fiber optic network overlaid with a Gigabit Ethernet network in accordance with one embodiment of the present invention.

FIG. 1 illustrates a typical SONET-based fiber optic network overlaid with a Gigabit Ethernet network in accordance with one embodiment of the present invention. The network 100, shown in FIG. 1, has a plurality of nodes. The network nodes include a CO 105 and a plurality of RTs shown as RTs 110a through 110c. The RTs are connected to each other and to the CO 105 by optical fiber. An ADM employing WDM hardware is implemented at each network node to allow transmission of data through a plurality of optical wavelengths. The operational benefit of using an existing SONET network having a loop topology and a redundant counter-rotating configuration is apparent in two aspects of data transmission, nodal failure and fiber failure.

Figure 2:
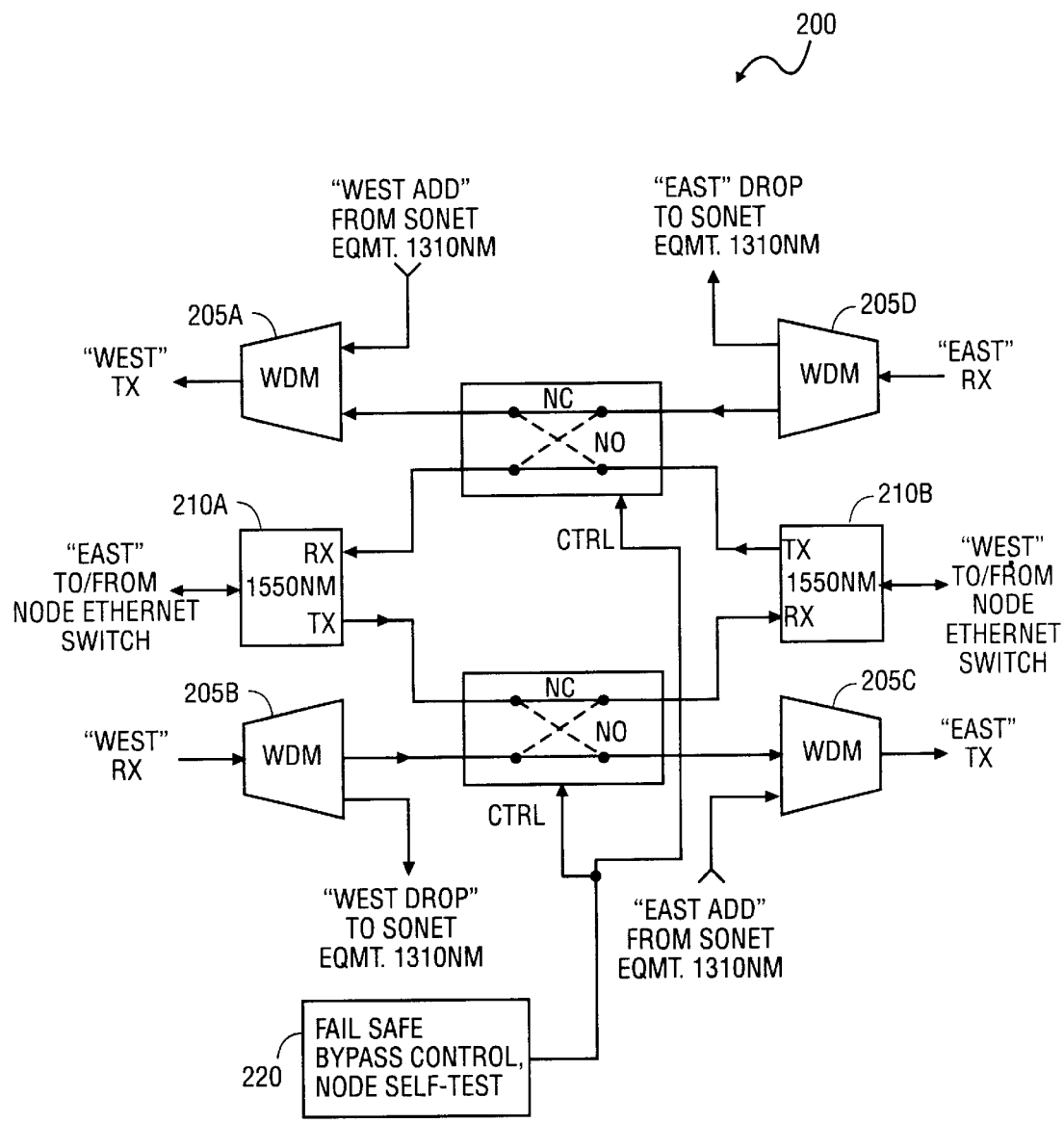
FIG. 2 is a schematic diagram of an optical add/drop multiplexer and protection switch according to one embodiment.

FIG. 2 is a schematic diagram of the ADM hardware discussed above in reference to FIG. 1. The ADM system 200, shown in FIG. 2, contains four WDMs 205a through 205d. The WDMs allow different data types to be transmitted together on a fiber. For example, network 100 may carry SONET data over a given wavelength (e.g., 1310 nanometers (nm)), and may carry Gigabit Ethernet data over a different wavelength (e.g., 1550 nm). At each node, the WDMs 205a through 205d split the SONET carrier wavelength out and pass it through the SONET network equipment. All packet traffic is diverted to Ethernet. The Gigabit Ethernet carrier wavelength is received and transmitted through optical transceivers 210a and 210b. From the transceivers the Gigabit Ethernet carrier wavelength is transmitted to optical switches 215a and 215b. In one embodiment the optical switches are 2×2 optical micro-electro-mechanical switches (MEMSs) that form the protection switch. In an alternative embodiment the optical switches 215a and 215b may be coil-based relays. In another alternative embodiment, optical switches 215a and 215b may be liquid crystal display (LCD) shutters. The optical switches 215a and 215b are implemented such that in the event of a failsafe (i.e., the node experiences any form of failure or loss of power), they are placed in a bypass mode by control 220. The bypass mode allows the Gigabit Ethernet carrier wavelength (e.g., 1550 nm) to pass through the node uninterrupted and unaffected. In one embodiment there may be slight attenuation of the carrier through the node, but for all practical purposes, the node experiencing a failsafe is shunted from the network.

Control 220 may also be used to bypass the optical transceivers to perform a self-test. In such a bypass mode, the optical switches 215a and 215b are set so that the east transmission path is coupled to the east receiving path and the west transmission path is coupled to the west receiving path. This allows the gigabit Ethernet transceivers to communicate with each other to ensure that the interfaces are operational before connecting to the ring. When the self-testing is complete, the optical switches 215a and 215b are changed so that on the east side, receive data gets coupled through to the east side transceiver and the east side transmit is coupled to the east side part of the loop and vice versa. This provides a self-test capacity and a no-load bypass capacity and also a way of inserting the Ethernet network onto the ring without disruption.

Figure 3:
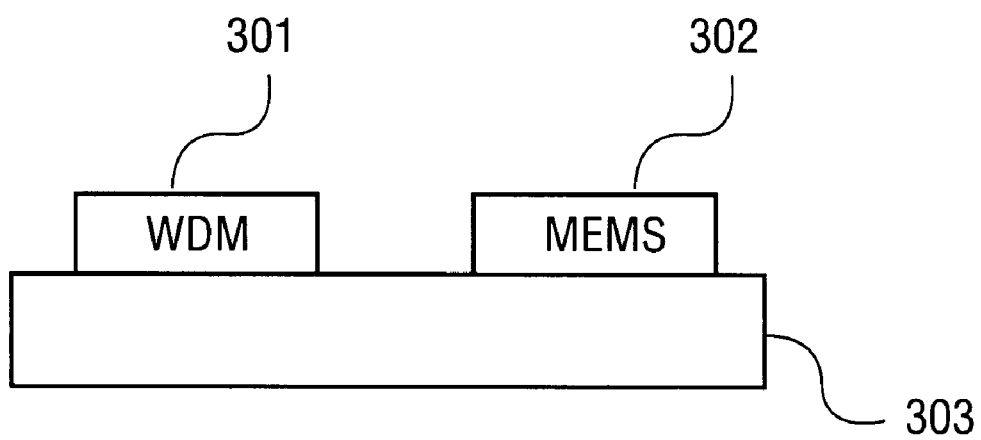

FIG. 3 illustrates one embodiment wherein the protection switch is a micro-electromechanical switch 301, and the wave division multiplexer 302 and the micro-electromechanical switch 301 are integrated on a substrate 303.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be recorded in an illustrative sense rather than a restrictive sense.

What is claimed is:

1. A method for overlaying a packet-based telecommunications network on a time division multiplex based telecommunications network having ring topology, the method comprising:

implementing an add-drop multiplexer at a node of the time division multiplex based telecommunications system, the add-drop multiplexer comprising at least one wave division multiplexers, at least one set of optical transceivers for receiving and transmitting a division multiplex carrier wavelength, at least one optical switch, and at least one control switch to place the at least one optical switch in a self-test bypass mode and allow communication between the optical transceivers to determine operability thereof; and transmitting time division multiplex based data over a first light frequency and packet-based data over a second light frequency.

2. The method of claim 1 wherein the time division multiplex based telecommunications network is a SONET network.

3. The method of claim 1 wherein the packet-based telecommunications network is a Gigabit Ethernet network.

4. The method of claim 1 wherein the first light frequency is 1310 nanometers and the second light frequency is 1550 nanometers.

5. The method of claim 1 wherein the at least one optical switch comprises at least one protection switch.

6. The method of claim 5 wherein the at least one protection switch is a micro-electromechanical switch.

7. The method of claim 6 wherein the at least one wave division multiplexer and the at least one micro-electromechanical switch are integrated on a substrate.

8. An apparatus comprising:

at least one set of optical transceivers to transmit and receive optical data;

at least one wave division multiplexer, the at least one wave division multiplexer allowing the transmission of time division multiplex based data over a first light frequency, the at least one wave division multiplexer allowing the transmission of packet-based data over a second light frequency;

at least one optical switch; and at least one control switch to place the at least one optical switch in a self-test bypass mode and allow communication between the at least one set of optical transceivers to determine operability thereof.

9. The apparatus of claim 8 wherein the first light frequency is 1310 nanometers and the second light frequency is 1550 nanometers.

10. The apparatus of claim 8 wherein the at least one optical switch is a micro-electromechanical switch.

11. The apparatus of claim 10 wherein the at least one wave division multiplexer and the at least one micro-electromechanical switch are integrated on a substrate.

\* \* \* \* \*